United States Patent
Wu et al.

(10) Patent No.: US 12,429,610 B2
(45) Date of Patent: Sep. 30, 2025

(54) SYSTEM FOR MONITORING RADIATION EXPOSURE USING EYEBALL-ATTACHABLE APPARATUS FOR MEASURING RADIATION

(71) Applicant: PAPRICA Lab. Co., Ltd., Seoul (KR)

(72) Inventors: Hong Gyun Wu, Seoul (KR); Jung In Kim, Seoul (KR); Sang Hoon Heo, Seoul (KR); Song Yi Heo, Seoul (KR); Chang Heon Choi, Gyeonggi-do (KR); Jin Hyuck Heo, Gyeonggi-do (KR); Min Jae Choi, Seoul (KR)

(73) Assignee: PAPRICA Lab. Co., Ltd., Seoul (KR)

( * ) Notice: Subject to any disclaimer, the term of this patent is extended or adjusted under 35 U.S.C. 154(b) by 126 days.

(21) Appl. No.: 18/522,983

(22) Filed: Nov. 29, 2023

(65) Prior Publication Data
US 2025/0076524 A1   Mar. 6, 2025

(30) Foreign Application Priority Data
Aug. 31, 2023   (KR) .................. 10-2023-0115828

(51) Int. Cl.
*G01T 1/02*   (2006.01)

(52) U.S. Cl.
CPC ..................... *G01T 1/02* (2013.01)

(58) Field of Classification Search
CPC ... G01T 1/02; A61B 3/18; A61F 2009/00846; A61F 2009/00863; A61F 2009/00872; A61F 9/00
See application file for complete search history.

(56) References Cited

U.S. PATENT DOCUMENTS

| | | | |
|---|---|---|---|
| 2014/0107445 A1* | 4/2014 | Liu | A61B 5/14507 600/345 |
| 2016/0361198 A1* | 12/2016 | Wiechmann | A61F 9/00829 |
| 2017/0332900 A1 | 11/2017 | Li | |
| 2018/0034507 A1 | 2/2018 | Wobak et al. | |
| 2020/0310163 A1 | 10/2020 | Zheng et al. | |

FOREIGN PATENT DOCUMENTS

| | | |
|---|---|---|
| CN | 115501478 A | 12/2022 |
| KR | 10-1574076 B1 | 12/2015 |
| KR | 10-2022-0102070 A | 7/2022 |

* cited by examiner

*Primary Examiner* — Gerald Johnson
(74) *Attorney, Agent, or Firm* — IP Legal Services, LLC

(57) ABSTRACT

The present disclosure relates to a system for monitoring radiation exposure using an eyeball-attachable apparatus for measuring radiation, the system including an apparatus for measuring radiation configured to be attachable to an eyeball of a person under measurement and to measure the amount of radiation exposure while being attached to the eyeball of the person under measurement; and a monitoring apparatus configured to receive measurement information about the amount of radiation exposure from the apparatus for measuring radiation, and to display information about the amount of radiation exposure of the person under measurement, thereby enabling real-time monitoring of the exposure dose according to the radiation exposure of a person under measurement, and further the remarkable reduction of the risk of explosion compared to existing lithium-based batteries, by applying a perovskite-based battery part, as well as smooth supply of power.

20 Claims, 5 Drawing Sheets

SYSTEM FOR MONITORING RADIATION EXPOSURE USING EYEBALL-ATTACHABLE APPARATUS FOR MEASURING RADIATION

CROSS REFERENCE TO RELATED APPLICATION

The present application claims priority of Korean Patent Application No. 10-2023-0115828 filed on Aug. 31, 2023, the entire contents of which are incorporated herein for all purposes by this reference.

BACKGROUND OF THE DISCLOSURE

Field of the Disclosure

The present disclosure relates to a system for monitoring radiation exposure using an eyeball-attachable apparatus for measuring radiation and, more particularly, to a system for monitoring radiation exposure using an eyeball-attachable apparatus for measuring radiation which enables real-time monitoring of the amount of radiation exposure after being worn on the eyeball of a person in a radiation working environment or radiation medical environment.

Description of the Related Art

People exposed to radiation in working environments (e.g., workers in nuclear power plants) or people exposed to radiation in medical environments (e.g., patients or medical staves in radiation diagnosis or treatment environments) may suffer damage such as central nervous system damage, hematopoietic tissue damage, leukemia, osteosarcoma, thyroid cancer, and death if the amount of radiation exposure exceeds a certain limit. Hereinafter, people exposed to radiation in working environments or people working in the medical environments exposed to radiation are collectively referred to as 'a person under measurement'.

Accordingly, dosimeters that can measure the amount of radiation exposure of people exposed to a radiation environment are being developed.

Types of the dosimeters are classified into a thermo-luminescence dosimeter (TLD), which uses the thermal fluorescence phenomenon that occurs when a crystalline material irradiated with radiation is heated, an optically stimulated luminescent dosimeter (OSLD), which uses the luminescence phenomenon that occurs when a laser is irradiated to aluminum oxide irradiated with radiation, a pocket dosimeter (P. D) using the principle of thin film electroscope, and the like.

However, in the case of the thermo-luminescence dosimeter and the optically stimulated luminescent dosimeter, accumulated dose is evaluated, so they have a limitation in measuring the amount of radiation exposure in real time, and in the case of the pocket dosimeter, the dose for whole body radiation exposure is evaluated, so it has a limitation in measuring the amount of radiation exposure for each specific body part of a person under measurement.

Further, conventional dosimeters generally use lithium-based batteries as batteries for supplying power, and, however, lithium-based batteries have a risk of explosion because they contain a liquid electrolyte, so that they have a limitation in their application to body-wearable dosimeters.

The above-described background technology is technical information that the inventor possessed for deriving the present disclosure or acquired in the process of deriving the present disclosure, and cannot necessarily be construed as known technology disclosed to the general public before filing the application for the present disclosure.

DOCUMENT OF RELATED ART

Patent Document

Patent Document 1: Korean Patent No. KR 10-1574076 (Registered on Nov. 27, 2015)

SUMMARY OF THE DISCLOSURE

In order to solve the above-mentioned drawbacks, the present disclosure will provide a system for monitoring radiation exposure using an eyeball-attachable apparatus for measuring radiation which enables real time monitoring of the radiation dose according to the radiation exposure of the person under measurement.

Additionally, the object of the present disclosure is to provide a system for monitoring radiation exposure using an eyeball-attachable apparatus for measuring radiation which enables the remarkable reduction of the risk of explosion compared to existing lithium-based batteries, by applying a perovskite-based battery part to an apparatus for measuring radiation, as well as smooth supply of power.

Technical objects, which the present disclosure is to accomplish, are not limited to the aforementioned ones, and other technical objects not mentioned above may be clearly appreciated from the following detailed description by a person having ordinary skill in the art to which the present disclosure pertains.

A system for monitoring radiation exposure using an eyeball-attachable apparatus for measuring radiation according to an embodiment of the present disclosure includes an apparatus for measuring radiation configured to be attachable to an eyeball of a person under measurement and to measure the amount of radiation exposure while being attached to the eyeball of the person under measurement; and a monitoring apparatus configured to receive measurement information about the amount of radiation exposure from the apparatus for measuring radiation, and to display information about the amount of radiation exposure of the person under measurement.

In this case, the apparatus for measuring radiation may include a measurement part configured to measure the amount of radiation exposure for the person under measurement; and a battery part configured to supply power to the measurement part.

In this regard, the measurement part may include a first sensor part configured to generate mobile charges in response to radiation; an amplification part configured to amplify a signal of the mobile charges generated in the first sensor part; a conversion part configured to convert the signal of the mobile charges amplified by the amplification part into a digital signal; a first control part configured to obtain radiation exposure amount information based on the digital signal converted by the conversion part; a first data base part configured to store the radiation exposure amount information obtained by the first control part; and a first communication part including a first antenna part, and configured to transmit the radiation exposure amount information stored in the first data base part to the monitoring apparatus through the first antenna part.

Meanwhile, the battery part may include a second sensor part configured to generate mobile charges in response to visible light; and a charge collection part configured to store the mobile charges generated in the second sensor part, and to supply power to the measurement part.

In this case, the monitoring apparatus may include a second communication part including a second antenna part, and configured to receive the radiation exposure amount information from the apparatus for measuring radiation through the second antenna part; a second data base part configured to store matching information about exposure dose corresponding to the radiation exposure amount information, and to store the radiation exposure amount information received by the second communication part; a display part configured to display an exposure dose information of the person under measurement; and a second control part configured to use the radiation exposure amount information received by the second communication part to calculate an exposure dose of the person under measurement based on the matching information about exposure dose stored in the second data base part, and to control the display part to display the exposure dose information of the person under measurement.

Meanwhile, the first sensor part may include perovskite.

Meanwhile, the apparatus for measuring radiation may include a base part configured in the form of a soft contact lens to be in direct contact with the eyeball of the person under measurement; a lower installation part configured in a dome shape to be stacked on the upper surface of the base part; an upper installation part configured in a dome shape to be stacked on the upper surface of the lower installation part; and a cover part configured in the form of a soft contact lens to be stacked on the upper surface of the upper installation part.

Meanwhile, in a system for monitoring radiation exposure using an eyeball-attachable apparatus for measuring radiation, i) the first sensor part may be configured in the shape of an arc; ii) the amplification part, the conversion part, the first control part, the first data base part, the first communication part, and the charge collection part may be designed as an integrated circuit and embedded in a circuit chip; iii) the second sensor part may be configured in the shape of an arc; iv) the first antenna part may be configured in the shape of a ring; and v) the first sensor part, the circuit chip, the second sensor part, and the first antenna part may be stacked between the lower installation part and the upper installation part in a sandwich form.

In this case, the lower installation part and the upper installation part may be configured by a hydrophobic material and be configured to seal the first sensor part, the circuit chip, the second sensor part, and the first antenna part by being compressed together.

Also, the lower installation part and the upper installation part may be each configured in a dome shape with a top portion removed.

In this case, the base part and the cover part may be configured by a transparent material.

Meanwhile, the base part may be configured by a hydrophilic material.

Meanwhile, the upper installation part may be provided with a lower surface where a first seating groove is formed for allowing the first sensor part, the circuit chip, and the second sensor part to be seated therein, and a second seating groove is formed for allowing the first antenna part to be seated therein.

In addition, the cover part may have a third seating groove formed on its lower surface in which the upper installation part is seated.

Meanwhile, the second sensor part may include perovskite.

In this case, the charge collection part may be constituted by a supercapacitor.

Meanwhile, the first communication part and the second communication part may be configured to transmit and receive the radiation exposure amount information to and from each other in a wireless communication method established between each other.

In this case, the first communication part and the second communication part may be configured to transmit and receive the radiation exposure amount information to and from each other in an NFC wireless communication method established between each other.

In this case, the first control part may be configured to allow the battery part to supply power to the measurement part when the NFC tag of the monitoring apparatus is performed first time; and transmit the radiation exposure amount information stored in the first data base part to the monitoring apparatus when the NFC tag of the monitoring apparatus is performed second time.

Additionally, the first control part may be configured to prevent the battery part from supplying power to the measurement part when the NFC tag of the monitoring apparatus is performed second time.

As described above, the radiation exposure monitoring system using the eyeball-attachable apparatus for measuring radiation according to the present disclosure enables real-time monitoring of the exposure dose according to the radiation exposure of the person under measurement.

Additionally, the radiation exposure monitoring system using the eyeball-attachable apparatus for measuring radiation according to the present disclosure can significantly reduce the risk of explosion compared to existing lithium-based batteries, by applying the perovskite-based battery part to an apparatus for measuring radiation, while smoothly supplying power.

The effects of the present disclosure are not limited to the aforementioned ones, and other technical effects not mentioned above may be clearly appreciated from the following detailed description by a person having ordinary skill in the art to which the present disclosure pertains.

DETAILED DESCRIPTION OF THE DISCLOSURE

Figure 1:
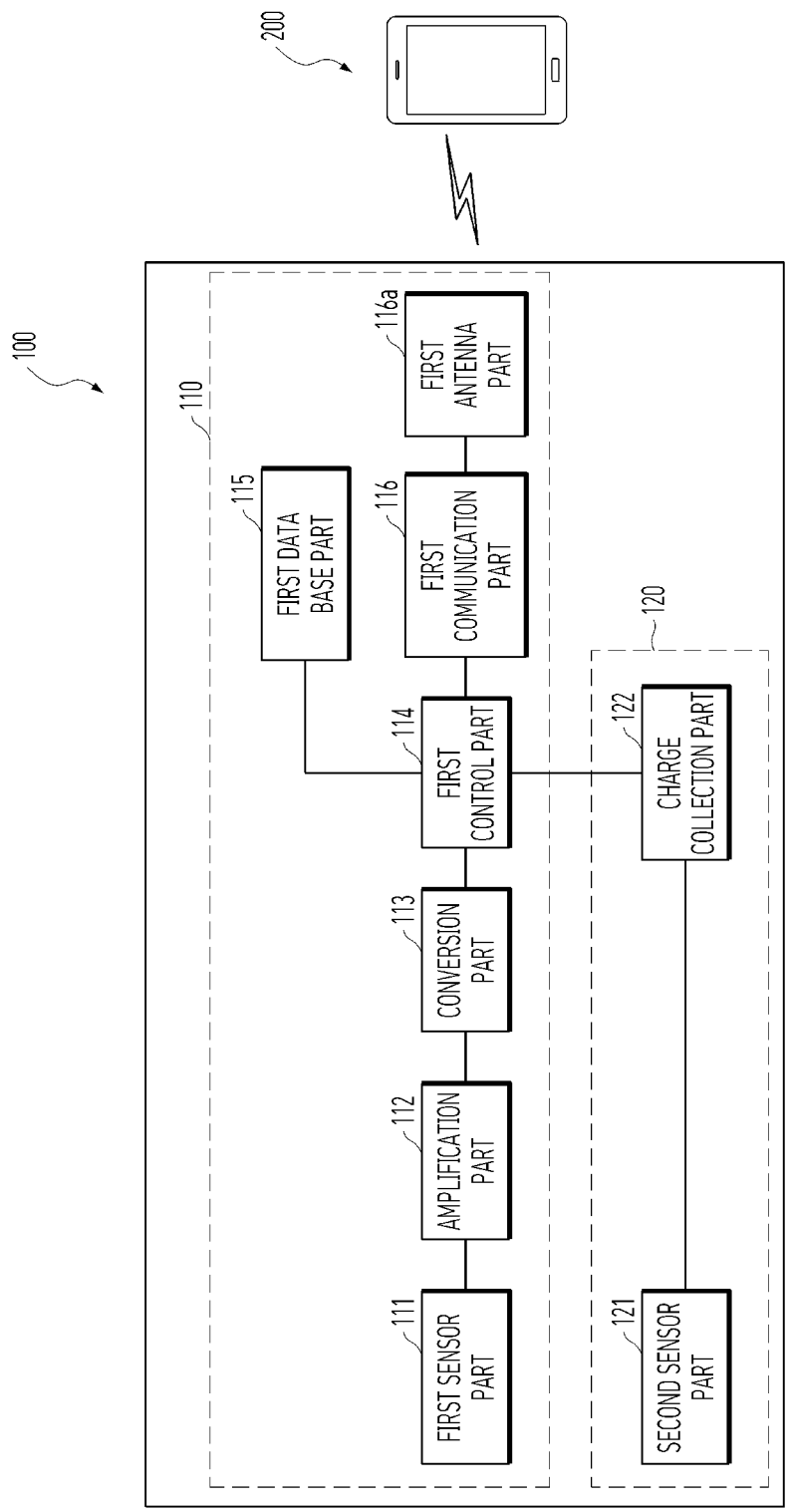
FIG. 1 is a block diagram of a system for monitoring radiation exposure using an eyeball-attachable apparatus for measuring radiation according to an embodiment of the present disclosure.

Herein, the accompanying drawings may be shown in exaggerated expressions for differentiation and clarity from the prior art, and for convenience in understanding the technology. In addition, the terms described below are defined in view of functions in the present disclosure, and may vary depending on the intention of the user or operator, or practice, and thus definitions of these terms should be made based on the technical contents throughout this specification. Meanwhile, the examples are merely illustrative of the components presented in the claims of the present disclosure, and do not limit the scope of the present disclosure, and the right scope should be interpreted based on the technical idea throughout the specification of the present disclosure.

Throughout this specification, when a component "includes" or "comprises" another component, it does not mean that the component excludes a component other than said another component, but instead that the component may further include other components unless expressly stated to the contrary.

In addition, when a component is described as being "connected," "contacted," or "coupled" to another component, this means not only the case where the component is "directly connected," "directly contacted," or "directly coupled" to said another component, but also the case where the component is "indirectly connected," "indirectly contacted," or "indirectly coupled" to said another component with other component intervened therebetween. Contrarily, when a component is described as being "directly connected," "directly contacted," or "directly coupled" to another component, this should be understood as that no other component exists between them.

Additionally, when a directional term such as "front", "back", "top", "bottom", "left", "right", "one end", "other end", "opposite ends", or the like is used, this is used as an example in relation to the orientation in the disclosed drawings, and should not be construed as being restrictive. Also, when a term such as "first," "second" or the like is used, this is a term used to distinguish components from each other, and should not be construed as being restrictive.

In order to more clearly explain the features of the embodiments of the present disclosure, detailed descriptions will be omitted regarding matters widely known to those skilled in the art to which the following embodiments pertain. And, detailed description of parts in the drawings that are not related to the description of the embodiment will be omitted.

Hereinafter, embodiments f the disclosure will be described in detail with reference to the accompanying drawings.

Figure 2:
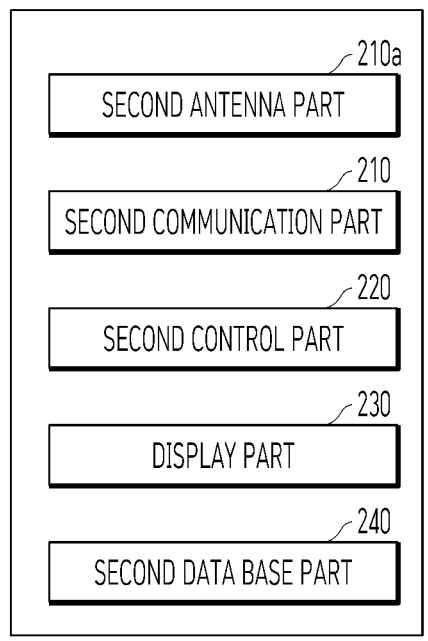
FIG. 2 is a block diagram of a monitoring apparatus according to an embodiment of the present disclosure.
Figure 3:
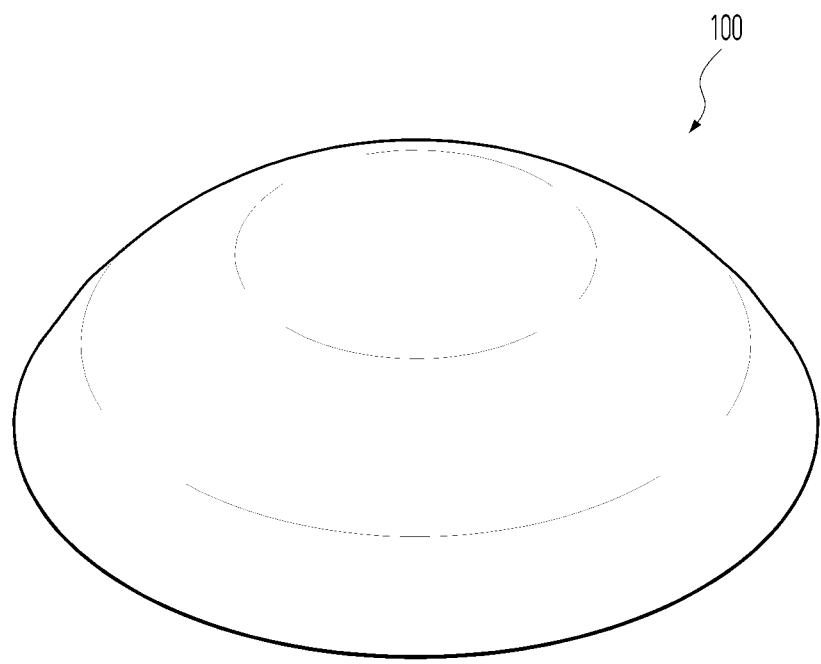
FIG. 3 is a perspective view of an apparatus for measuring radiation according to an embodiment of the present disclosure.
Figure 4:
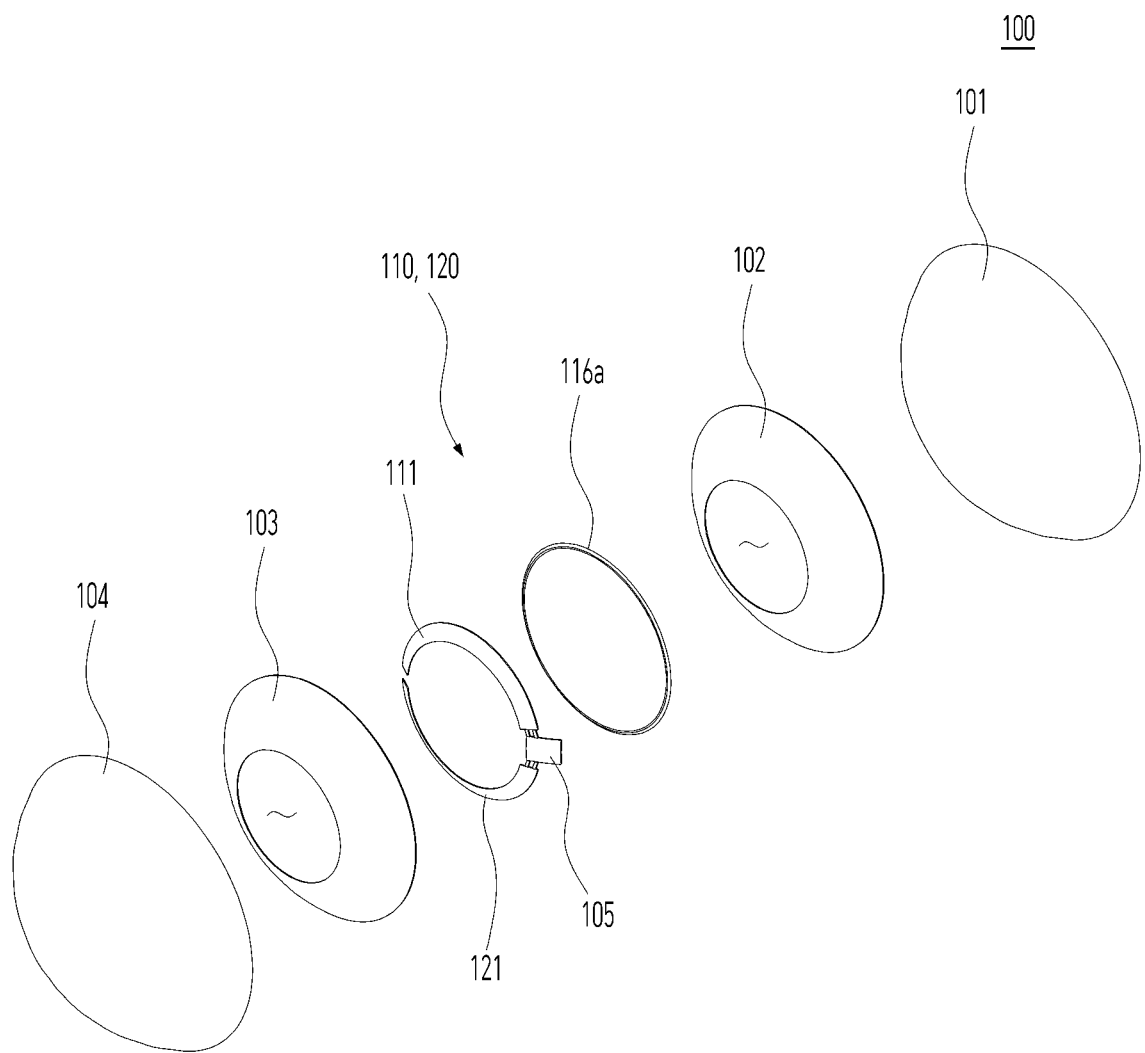
FIG. 4 is an exploded perspective view of the apparatus for measuring radiation shown in FIG. 3.
Figure 5:
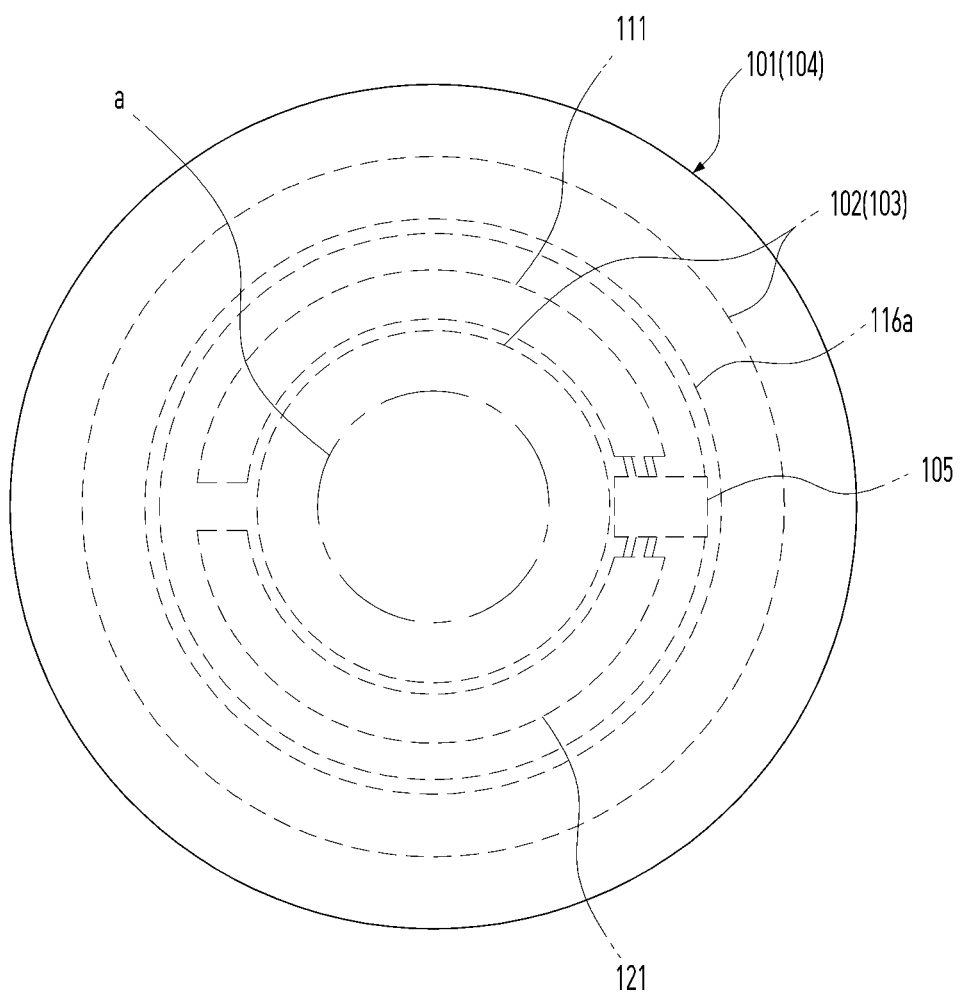
FIG. 5 is a schematic plan view of the apparatus for measuring radiation shown in FIG. 3, and is a diagram for explaining its internal structural arrangement.
Figure 6:
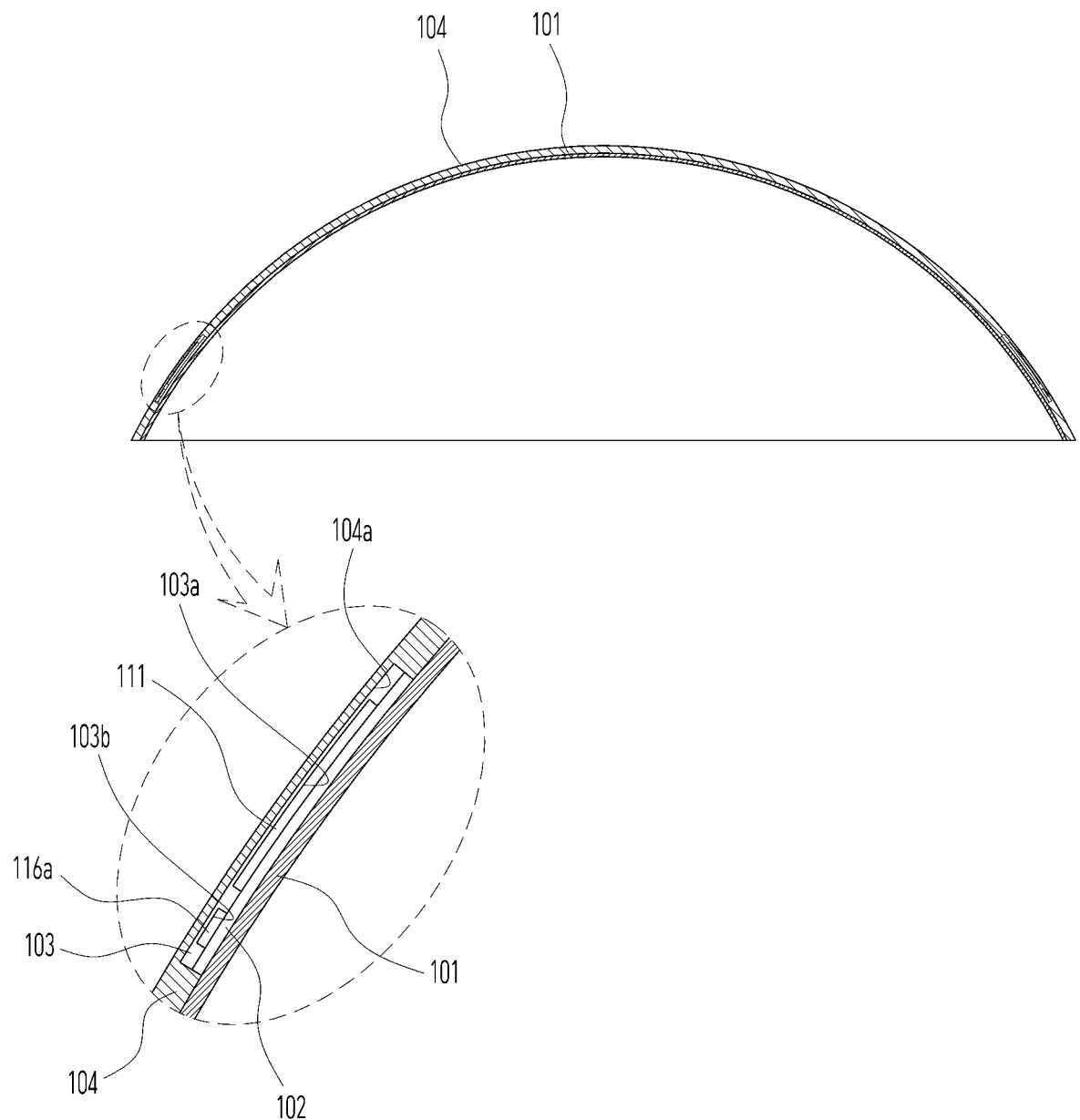
FIG. 6 is a schematic cross-sectional view of the apparatus for measuring radiation shown in FIG. 3.

FIG. 1 is a block diagram of a system for monitoring radiation using an eyeball-attachable apparatus for measuring radiation according to an embodiment of the present disclosure; FIG. 2 is a block diagram of a monitoring apparatus according to an embodiment of the present disclosure; FIG. 3 is a perspective view of an apparatus for measuring radiation according to an embodiment of the present disclosure; FIG. 4 is an exploded perspective view of the apparatus for measuring radiation shown in FIG. 3; FIG. 5 is a schematic plan view of the apparatus for measuring radiation shown in FIG. 3, and is a diagram for explaining its internal structural arrangement; and FIG. 6 is a schematic cross-sectional view of the apparatus for measuring radiation shown in FIG. 3.

Referring to FIGS. 1 to 6, the system for monitoring radiation exposure using an eyeball-attachable apparatus for measuring radiation according to an embodiment of the present disclosure includes an apparatus for measuring radiation 100 and a monitoring apparatus 200.

The apparatus for measuring radiation 100 is configured to be attachable to the eyeball of a person under measurement and to measure the amount of radiation exposure while being attached to the eyeball of the person under measurement.

The apparatus for measuring radiation 100 may include a measurement part 110 and a battery part 120.

The measurement part 110 is configured to measure the amount of radiation exposure for the person under measurement.

The measurement part 110 may include a first sensor part 111, an amplification part 112, a conversion part 113, a first control part 114, a first data base part 115, and a first communication part 116.

The first sensor part 111 is configured to generate mobile charges in response to radiation.

The first sensor part 111 may include perovskite.

Perovskite is the name referring to a mineral newly discovered in the Ural Mountains of Russia in 1839, and originating from Lev Perovsky, a 19th century Russian mineralogist. The chemical formula of perovskite is $CaTiO_3$, and furthermore, perovskite refers to any material that has the same structure as $CaTiO_3$.

Perovskite has a compound crystal structure formed by being combined with metals, organic substances, and halogens (fluorine, chlorine, bromine, etc.), and has high light absorption property and excellent charge transfer ability, so when radiation is irradiated, it responds to the radiation to generate mobile charges.

Thus, since the first sensor part 111 includes perovskite, when radiation is irradiated to it, it responds to the radiation to generate mobile charges. At this time, it was experimentally confirmed that the mobile charges form an electric current in nA unit within the circuit of the measurement part 110.

The form of the first sensor part 111 will be described later.

The amplification part 112 is configured to amplify the signal of the mobile charges generated in the first sensor part 111. As described above, the amplification part 112 is configured to amplify the signal to enable more accurate measurement of the electric current in nA unit formed within the circuit of the measurement part 110 by the first sensor part 111, and may employ any one of a number of known current (or voltage) amplifiers.

The conversion part 113 is configured to convert the signal of the mobile charges amplified by the amplification part 112 into a digital signal. The conversion part 113 may be configured as an analog-to-digital converter (ADC) type sensor to derive an amplified electric current (or voltage) information value.

The first control part 114 is configured to obtain radiation exposure amount information based on the digital signal converted by the conversion part 113. At this time, the radiation exposure amount information may be the electric current (or voltage) information value derived from the conversion part 113. The first control part 114 may be configured to store the electric current (or voltage) information values of the conversion part 113 in the first data base part 115 at predetermined time intervals.

The first control part 114 may be configured to control the operation of the apparatus for measuring radiation 100 while interworking with the monitoring apparatus 200, as will be described later.

The first data base part 115 is configured to store the radiation exposure amount information n obtained by the first control part 114. When the first communication part 116 is an NFC communication module, the first data base part 115 may be a storage module embedded in the first communication part 116.

The first communication part 116 includes a first antenna part 116*a*, and is configured to transmit the radiation exposure amount information stored in the first data base part 115 to the monitoring apparatus 200 through the first antenna part 116*a*.

The first communication part 116 may be configured to transmit and receive the radiation exposure amount information to and from the monitoring apparatus 200 in a wireless communication method established between each other. Examples of this wireless communication method may include a Wifi wireless communication method, a Zigbee wireless communication method, a Z-Wave wireless communication method, a Bluetooth wireless communication method, an NFC wireless communication method, and the like.

At this time, it is more preferable that the first communication part 116 is configured to transmit and receive the radiation exposure amount information to and from the monitoring apparatus 200 in an NFC wireless communication method established between each other. The NFC wireless communication method is a non-contact wireless communication method in which data can be exchanged at a short distance of about 10 cm or less using a frequency of 13.56 MHz band, and operates on the principle of electromagnetic induction, so it has the advantage of requiring no battery charging. When applying the NFC wireless communication method, a measurer (e.g., referring to a person carrying the monitoring apparatus 200, or possibly to a person under measurement who performs self-measurement) can easily interwork the two apparatuses 100 and 200 in a tag method by bringing the monitoring apparatus 200 into proximity with the apparatus for measuring radiation 100. A more specific example will be described later along with the shape of the first antenna part 116*a*.

The respective components of the apparatus for measuring radiation 100 can be electrically connected to each other, and, however, since many technologies are known for such electrical connection, detailed descriptions thereof will be omitted herein. The description of integrating circuits of the apparatus for measuring radiation 100 will be presented later.

The battery part 120 is configured to supply power to the measurement part 110.

The battery part 120 may include a second sensor part 121 and a charge collection part 122.

The second sensor part 121 may include perovskite. Thus, since the second sensor part 121 includes perovskite, it has high light absorption property, so it responds to incoming visible light to generate mobile charges. At this time, it was experimentally confirmed that the mobile charges form an electric current in mA unit in the circuit of the battery part 120 circuit, unlike in the circuit of the measurement part 110, and that a separate amplification means is not required.

The form of the second sensor part 121 will be described later.

The charge collection part 122 is configured to store the mobile charges generated in the second sensor part 121, and to supply power to the measurement part 110.

The charge collection part 122 may be constituted by a supercapacitor. Also, the charge collection part 120 is preferably constituted in the form of film.

The supercapacitor refers to a component whose electric capacity performance is particularly and intensively strengthened among the performances of capacitors (condensers), and which is intended to be used for battery purposes.

The charge collection part 122 may be electrically connected to the first control part 114, and may be configured to supply power to the measurement part 110 under the control of the first control part 114. This control method will be described later.

The battery part 120 supplies power to the measurement part 110 in a manner similar to a solar cell.

The monitoring apparatus 200 is configured to receive measurement information about the amount of radiation exposure from the apparatus for measuring radiation 100, and to display information about the amount of radiation exposure of a person under measurement.

The monitoring apparatus 200 may be the measurer's portable terminal (e.g., smart phone, tablet, laptop, or the like) or a separate terminal (e.g., desktop, monitoring display equipment, or the like). As described above, the measurer refers to a person who carries the monitoring apparatus 200, and may also be a person under measurement who performs self-measurement.

The monitoring apparatus 200 may include a second communication part 210, a second control part 220, a display part 230, and a second data base part 240.

The second communication part 210 includes a second antenna part 210*a*, and is configured to receive the radiation exposure amount information from the apparatus for measuring radiation 100 through the second antenna part 210*a*.

The second communication part 210 may be configured to transmit and receive the radiation exposure amount information to and from the apparatus for measuring radiation 100 in a wireless communication method established between each other. In other words, the first communication part 116 and the second communication part 210 may be configured to transmit and receive the radiation exposure amount information to and from each other in a wireless communication method established between each other. Examples of this wireless communication method may include a Wifi wireless communication method, a Zigbee wireless communication method, a Z-Wave wireless communication method, a Bluetooth wireless communication method, an NFC wireless communication method, and the like.

In this regard, it is more preferable that the second communication part 210 is configured to transmit and receive the radiation exposure amount information to and from the apparatus for measuring radiation 100 in the NFC wireless communication method established between each other. In other words, it is more preferable that the first communication part 116 and the second communication part 210 are configured to transmit and receive the radiation exposure amount information to and from each other in the NFC wireless communication method established between each other.

When applying the NFC wireless communication method, a measurer (e.g., referring to a person possessing the monitoring apparatus 200, or possibly to a person under measurement who performs self-measurement) can easily interwork the two apparatuses 100 and 200 in a tag method by bringing the monitoring apparatus 200 into proximity with the apparatus for measuring radiation 100. More specific examples will be described later.

The second communication part 210 may be a wireless communication module of a user's portable terminal (e.g., smart phone, tablet, laptop, or the like) or a separate terminal (e.g., desktop, monitoring display device, or the like).

The second data base part 240 is configured to store matching information about exposure dose corresponding to the radiation exposure amount information, and to store the radiation exposure amount information received by the second communication part 210. In this regard, the matching information about exposure dose corresponding to the radiation exposure amount information may be a calculation formula for deriving the exposure dose value considering the dark current noise of the apparatus for measuring radiation, or experimental values obtained through experiments (i.e., the exposure dose value matched to the current (or voltage) information value derived from the conversion part 113 of the apparatus for measuring radiation 100).

The second data base part 240 may be configured to store information generated by the second control part 230.

The second data base part 240 may be a storage module of a user's portable terminal (e.g., smart phone, tablet, laptop, or the like) or a separate terminal (e.g., desktop, monitoring display device, or the like), and the display part 230 is configured to display the information about exposure dose of the person under measurement. That is, the display part 230 is configured to display the exposure dose value calculated by the second control part 220 in various forms.

The display part 230 may be a display module of a user's portable terminal (e.g., smart phone, tablet, laptop, or the like) or a separate terminal (e.g., desktop, monitoring display device, or the like).

The second control part 220 is configured to use the radiation exposure amount information received by the second communication part 210 to calculate the exposure dose of a person under measurement based on matching information about exposure dose stored in the second data base part 240, and to control the display part 230 to display the exposure dose information of the person under measurement. In this case, the second control part 220 may be configured to process and collect the exposure dose information of the person under measurement by person under measurement, by date, by time, and by accumulated amount over a specific period of time, and display it on the display part 230 according to the measurer's selection.

The second control part 240 may be implemented as an application or software.

The respective components of the monitoring apparatus 200 can be electrically connected to each other, and, however, since many technologies are known for such electrical connection, detailed descriptions thereof will be omitted herein.

Meanwhile, a power supply part for supplying power to the monitoring apparatus 200 may be further provided.

Meanwhile, the apparatus for measuring radiation 100 as a product may include a base part 101, a lower installation part 102, an upper installation part 103, and a cover part 104.

Prior to detailed description, the following points are presented: i) the first sensor part 111 is configured in the shape of an arc; ii) the amplification part 112, the conversion part 113, the first control part 114, the first data base part 115, the first communication part 116 (however, excluding the antenna part 116a), and the charge collection part 122 are designed as an integrated circuit and embedded into a circuit chip (ASIC) 105; iii) the second sensor part 121 is configured in the shape of an arc; and iv) the first antenna part 116a may be configured in the shape of a ring. Through this structure, even when a person under measurement wears the apparatus for measuring radiation 100, each of the above-described components does not block the pupil of the person under measurement (specifically, a pupil line a in FIG. 5), which is advantageous in securing the visual field.

More specifically, referring to FIG. 5, it was experimentally confirmed that it is advantageous for compact product design that, when viewed from the top, the first sensor part 111, the circuit chip 105, and the second sensor part 121 are sequentially connected to form a structure having an almost circular ring shape, and that the first antenna part 116a is configured in a ring shape of a size to surround the first sensor part 111 and the second sensor part 121. In this regard, since the first antenna part 116a is configured in a ring shape, it was also confirmed that, when applying the NFC tag method, there is an advantage in that the monitoring apparatus 200 can be well recognized no matter which direction it approaches.

The base part 101 is configured in the form of a soft contact lens to be in direct contact with the eyeball of a person under measurement. Since the base part 101 is in direct contact with the eyeball of the person under measurement, it is preferably configured by a hydrophilic material (e.g., polymacone material, 2-hydroxyethyl methacrylate (HEMA) material, or the like) to improve attachment or wearing comfort. Further, the base part 101 is preferably configured by a transparent material to ensure the visual field of a person under measurement.

The lower installation part 102 is configured in a dome shape to be stacked on the upper surface of the base part 101. In addition, the upper installation part 103 is configured in a dome shape to be stacked on the upper surface of the lower installation part 102.

In this case, the first sensor part 111, the circuit chip 105, the second sensor part 121, and the first antenna part 116a may be stacked between the lower installation part 102 and the upper installation part 103 in a sandwich form.

In this regard, it is preferable that the lower installation part 102 and the upper installation part 103 are configured by a hydrophobic material and are configured to seal the first sensor part 111, the circuit chip 105, the second sensor part 121, and the first antenna part 116a by being compressed together. With these technical features, the first sensor part 111, the circuit chip 105, the second sensor part 121, and the first antenna part 116a are protected from foreign substances or moisture, thereby improving product durability. Examples of the hydrophobic material may include, but are not limited to, thermoplastic polyurethane (TPU), thermo plastic elastomer (TPE), and the like.

Meanwhile, the lower installation part 102 and the upper installation part 103 may each be configured in a dome shape with a top portion removed. In this regard, it is advantageous for securing the visual field of the person under measurement to form respective openings which are greater in size than the pupil line a in FIG. 5.

Meanwhile, the upper installation part 103 may be provided with a lower surface where a first seating groove 103a is formed for allowing the first sensor part 111, the circuit chip 105, and the second sensor part 121 to be seated therein, and a second seating groove 103b is formed for allowing the first antenna part 116a to be seated therein. This structure improves the durability of the product.

The cover part 104 is configured in the form of a soft contact lens to be stacked on the upper surface of the upper installation part 103. The cover part 104 may be configured by any of hydrophilic and hydrophobic materials, and, however, since the cover part has the possibility of contacting the skin of the person under measurement, it is preferable to be configured by a hydrophilic material (e.g., polymacon material, HEMA material, or the like) in order to improve direct attachment or wearing comfort, and it is preferable to be configured by a transparent material in order to ensure the visual field of the person under measurement.

Meanwhile, the cover part 104 may have a third seating groove 104a formed on its lower surface in which the upper installation part 103 is seated. This structure improves the durability of the product.

Hereinafter, a control method of the present disclosure will be briefly described. It is assumed that the first communication part 116 and the second communication part 210 are configured to transmit and receive the radiation exposure amount information to and from each other in the NFC wireless communication method established between each other.

The user brings the monitoring apparatus 200 into the proximity of the apparatus for measuring radiation 100. In this regard, the first control part 114 may be configured to allow the battery part 120 to supply power to the measurement part 110 when the NFC tag of the monitoring apparatus 200 is performed first time, and to transmit the radiation exposure amount information stored in the first data base part 115 to the monitoring apparatus 200 when the NFC tag of the monitoring apparatus 200 is performed second time. With this configuration, when the user brings the monitoring apparatus 200 into the proximity of the apparatus for measuring radiation 100 first time, the power charged in the battery part 100 is applied to the measurement part 110 to obtain the radiation exposure amount information through the operation of the measurement part 110, and when the user brings the monitoring apparatus 200 into the proximity of the apparatus for measuring radiation 100 second time, the radiation exposure amount information stored in the first data base part 115 is transmitted to the monitoring apparatus 200 to derive the exposure dose of the person under measurement.

In this case, the first control part 114 may also be configured to reset the first data base part 115 when at the same time it transmits the radiation exposure amount information stored in the first data base part 115 to the monitoring apparatus 200 upon the second occurrence of the NFC tag of the monitoring apparatus 200.

In addition, the first control part 114 may be configured to prevent the battery part 120 from supplying power to the measurement part 110 when the NFC tag of the monitoring apparatus 200 is performed second time.

More specifically, the first control part 114 may also be configured to prevent the battery part 120 from supplying power to the measurement part 110 after it transmits the radiation exposure amount information stored in the first data base part 115 to the monitoring apparatus 200 upon the second occurrence of the NFC tag of the monitoring apparatus 200, for applying a driving power.

However, when the first data base part 115 is a storage module embedded in the first communication part 116 configured as an NFC communication module, it may be driven only by the NFC tag of the monitoring apparatus 200 without power being supplied by the battery part 120 for a predetermined period of time.

As described above, the radiation exposure monitoring system using the eyeball-attachable apparatus for measuring radiation according to the present disclosure enables real-time monitoring of the exposure dose according to the radiation exposure of the person under measurement, and the system can significantly reduce the risk of explosion compared to existing lithium-based batteries, by applying the perovskite-based battery part to a apparatus for measuring radiation, while smoothly supplying power.

While the present disclosure has been described with reference to the embodiments shown in the drawings as described above, it should be understood that they are merely illustrative, and that various modifications and other equivalent embodiments are possible based on common knowledge in the field to which the technology pertains. Accordingly, the true technical protection scope of the present disclosure should be determined by the claims described below based on the specific details of the disclosure described above.

INDUSTRIAL APPLICABILITY

The present disclosure relates to a radiation exposure monitoring system using an eyeball-attachable apparatus for measuring radiation, and can be used in industrial fields related to radiation measurement.

REFERENCE SIGN LIST a: Pupil line
100: Apparatus for measuring radiation
101: Base part
102: Lower installation part
103: Upper installation part
103a: First seating groove
103b: Second seating groove
104: Cover part
104a: Third seating groove
105: Circuit chip
110': Measurement part
111: First sensor part
112: Amplification part
113: Conversion part
114: First control part
115: First data base part
116: First communication part
116a: First antenna part
120: Battery part
121: Second sensor part
122: Charge collection part
200: Monitoring apparatus
210: Second communication part
210a: Second antenna part
220: Second control part
230: Display part
240: Second data base part

What is claimed is:

1. A system for monitoring radiation exposure using an eyeball-attachable apparatus for measuring radiation, the system comprising:
 an apparatus for measuring radiation configured to be attachable to an eyeball of a person under measurement and to measure the amount of radiation exposure while being attached to the eyeball of the person under measurement; and
 a monitoring apparatus configured to receive measurement information about the amount of radiation exposure from the apparatus for measuring radiation, and to display information about the amount of radiation exposure of the person under measurement.

2. The system for monitoring radiation exposure using an eyeball-attachable apparatus for measuring radiation of claim 1, wherein the apparatus for measuring radiation includes:

a measurement part configured to measure the amount of radiation exposure for the person under measurement; and a battery part configured to supply power to the measurement part.

3. The system for monitoring radiation exposure using an eyeball-attachable apparatus for measuring radiation of claim 2, wherein the measurement part includes:

a first sensor part configured to generate mobile charges in response to radiation;

an amplification part configured to amplify a signal of the mobile charges generated in the first sensor part;

a conversion part configured to convert the signal of the mobile charges amplified by the amplification part into a digital signal;

a first control part configured to obtain radiation exposure amount information based on the digital signal converted by the conversion part;

a first data base part configured to store the radiation exposure amount information obtained by the first control part; and a first communication part including a first antenna part, and configured to transmit the radiation exposure amount information stored in the first data base part to the monitoring apparatus through the first antenna part.

4. The system for monitoring radiation exposure using an eyeball-attachable apparatus for measuring radiation of claim 3, wherein the battery part includes:

a second sensor part configured to generate mobile charges in response to visible light; and a charge collection part configured to store the mobile charges generated in the second sensor part, and to supply power to the measurement part.

5. The system for monitoring radiation exposure using an eyeball-attachable apparatus for measuring radiation of claim 4, wherein the monitoring apparatus includes:

a second communication part including a second antenna part, and configured to receive the radiation exposure amount information from the apparatus for measuring radiation through the second antenna part;

a second data base part configured to store matching information about exposure dose corresponding to the radiation exposure amount information, and to store the radiation exposure amount information received by the second communication part;

a display part configured to display an exposure dose information of the person under measurement; and a second control part configured to use the radiation exposure amount information received by the second communication part to calculate an exposure dose of the person under measurement based on the matching information about exposure dose stored in the second data base part, and to control the display part to display the exposure dose information of the person under measurement.

6. The system for monitoring radiation exposure using an eyeball-attachable apparatus for measuring radiation of claim 3, wherein the first sensor part includes perovskite.

7. The system for monitoring radiation exposure using an eyeball-attachable apparatus for measuring radiation of claim 4, wherein the apparatus for measuring radiation includes:

a base part configured in the form of a soft contact lens to be in direct contact with the eyeball of the person under measurement;

a lower installation part configured in a dome shape to be stacked on the upper surface of the base part;

an upper installation part configured in a dome shape to be stacked on the upper surface of the lower installation part; and a cover part configured in the form of a soft contact lens to be stacked on the upper surface of the upper installation part.

8. The system for monitoring radiation exposure using an eyeball-attachable apparatus for measuring radiation of claim 7, wherein:

the first sensor part is configured in the shape of an arc;

the amplification part, the conversion part, the first control part, the first data base part, the first communication part, and the charge collection part are designed as an integrated circuit and embedded in a circuit chip;

the second sensor part is configured in the shape of an arc;

the first antenna part is configured in the shape of a ring; and the first sensor part, the circuit chip, the second sensor part, and the first antenna part are stacked between the lower installation part and the upper installation part in a sandwich form.

9. The system for monitoring radiation exposure using an eyeball-attachable apparatus for measuring radiation of claim 8, wherein the lower installation part and the upper installation part are configured by a hydrophobic material and are configured to seal the first sensor part, the circuit chip, the second sensor part, and the first antenna part by being compressed together.

10. The system for monitoring radiation exposure using an eyeball-attachable apparatus for measuring radiation of claim 9, wherein the lower installation part and the upper installation part are each configured in a dome shape with a top portion removed.

11. The system for monitoring radiation exposure using an eyeball-attachable apparatus for measuring radiation of claim 10, wherein the base part and the cover part are configured by a transparent material.

12. The system for monitoring radiation exposure using an eyeball-attachable apparatus for measuring radiation of claim 9, wherein the base part is configured by a hydrophilic material.

13. The system for monitoring radiation exposure using an eyeball-attachable apparatus for measuring radiation of claim 8, wherein the upper installation part is provided with a lower surface where a first seating groove is formed for allowing the first sensor part, the circuit chip, and the second sensor part to be seated therein, and a second seating groove is formed for allowing the first antenna part to be seated therein.

14. The system for monitoring radiation exposure using an eyeball-attachable apparatus for measuring radiation of claim 8, wherein the cover part has a third seating groove formed on its lower surface in which the upper installation part is seated.

15. The system for monitoring radiation exposure using an eyeball-attachable apparatus for measuring radiation of claim 4, wherein the second sensor part includes perovskite.

16. The system for monitoring radiation exposure using an eyeball-attachable apparatus for measuring radiation of claim 4, wherein the charge collection part is constituted by a supercapacitor.

17. The system for monitoring radiation exposure using an eyeball-attachable apparatus for measuring radiation of claim 5, wherein the first communication part and the second communication part are configured to transmit and receive the radiation exposure amount information to and from each other in a wireless communication method established between each other.

18. The system for monitoring radiation exposure using an eyeball-attachable apparatus for measuring radiation of claim 17, wherein the first communication part and the second communication part are configured to transmit and receive the radiation exposure amount information to and from each other in an NFC wireless communication method established between each other.

19. The system for monitoring radiation exposure using an eyeball-attachable apparatus for measuring radiation of claim 18, wherein the first control part is configured to:
- allow the battery part to supply power to the measurement part when the NFC tag of the monitoring apparatus is performed first time; and
- transmit the radiation exposure amount information stored in the first data base part to the monitoring apparatus when the NFC tag of the monitoring apparatus is performed second time.

20. The system for monitoring radiation exposure using an eyeball-attachable apparatus for measuring radiation of claim 19, wherein the first control part is configured to prevent the battery part from supplying power to the measurement part when the NFC tag of the monitoring apparatus is performed second time.

* * * * *